United States Patent
Olowinski et al.

[11] 3,885,767
[45] May 27, 1975

[54] SNAP-IN MOUNTING AND MOUNTING ASSEMBLY

[76] Inventors: Edward J. Olowinski, 1136 W. 34th St., Erie, Pa. 16508; Ernest H. Atkinston, 556 Timber Valley Rd., N.E., Atlanta, Pa. 30305

[22] Filed: Jan. 23, 1974

[21] Appl. No.: 435,800

[52] U.S. Cl. ............. 248/204; 248/27; 248/56; 248/358 R; 248/226 R; 248/225
[51] Int. Cl.² ........................................ F16F 15/04
[58] Field of Search ............ 248/27, 56, 300, 9, 10, 248/358 R, 226, 204, 225; 285/325; 403/241, 243; 308/237 R; 16/2, 105; 24/141, 142; 174/153 R, 153 G

[56] References Cited
UNITED STATES PATENTS

| | | | |
|---|---|---|---|
| 1,905,471 | 4/1933 | Kent et al. | 248/27 |
| 2,324,791 | 7/1943 | McLoughlin et al. | 285/325 |
| 2,638,575 | 5/1953 | Winkelmeyer et al. | 248/27 |
| 2,716,566 | 8/1955 | Thiry | 248/358 R |
| 2,954,248 | 9/1960 | Brickman | 248/56 |
| 3,801,209 | 4/1974 | Massuoka | 16/2 |

FOREIGN PATENTS OR APPLICATIONS 1,081,174   8/1967   United Kingdom ................ 16/2

*Primary Examiner*—Roy D. Frazier
*Assistant Examiner*—Robert A. Hafer

[57] ABSTRACT

A mounting including concentrically spaced inner and outer rigid sleeves having elastomeric means interposed and secured therebetween for resiliently accommodating relative axial and radial movement. A radially extending flange is carried by one end of the outer sleeve. Lock means is resiliently carried by the other end of the outer sleeve in axially opposed relation to the flange. The flange and lock means cooperate to facilitate snap-in installation and removal of the mounting relative to a support bracket. The structure to be supported is carried by the inner sleeve.

16 Claims, 6 Drawing Figures

PATENTED MAY 27 1975 3,885,767

SHEET 2

SNAP-IN MOUNTING AND MOUNTING ASSEMBLY

This invention relates to a mounting and, more particularly, to a snap-in mounting and mounting assembly.

In industry, there are many instances where it is necessary to resiliently mount one body relative to another so as to provide vibration and/or shock isolation therebetween. Such mountings require suitable means of interconnection to the respective bodies with the resilient means remaining free to resiliently accommodate relative movement. Typically, this interconnection has taken on forms which require additional parts and tools and excessive time and labor to install and/or remove and which make no contribution to the isolation characteristics of the mounting.

SUMMARY OF THE INVENTION

With the foregoing in mind, it is an object of the present invention to provide a snap-in mounting which can be installed and/or removed relative to a support without the need for additional parts and/or tools.

It is another object of the present invention to provide a mounting wherein the interconnection with the support contributes to the isolation properties of the mounting.

Briefly, the objects of the present invention are provided in a mounting including concentrically spaced inner and outer elongate rigid sleeves subject to relative movement. Elastomer is interposed and secured, preferably bonded, between the sleeves and resiliently accommodates the relative movement. A flange is carried by and adjacent one end of the outer sleeve and extends radially outward therefrom. The flange is continuous circumferentially of the outer sleeve. Lock means is resiliently carried by and adjacent the other end of the outer sleeve in opposed relation to the flange. The resilient mounting of the lock means normally maintains a predetermined axially spaced relation between the flange means and lock means and resiliently resist relative movement therebetween.

The lock means may comprise an annular lock ring concentrically disposed about the outer sleeve in circumferentially spaced relation thereto and in axially opposed relation to the flange. An annular elastomeric member having an L-shaped cross section is similarly concentrically disposed about the outer sleeve and has the end of one of its legs secured to the outer sleeve with the end of the other leg secured to the lock ring.

In a mounting assembly, a U-shaped support bracket is provided which receives the concentric sleeves between its legs. The legs of the support bracket are wedged between the flange and lock means. The resilient mounting of the lock means will allow its movement so as to receive the legs of the support bracket. In preferred embodiments, projections and recesses are provided to allow positive interlocking by the lock means with the support bracket. The structure to be supported is carried internally of and by the inner sleeve. The flange may take on a form identical to and the mirror image of the lock means to provide positive interlocking on both sides of the support bracket.

DETAILED DESCRIPTION OF INVENTION

Figure 1:
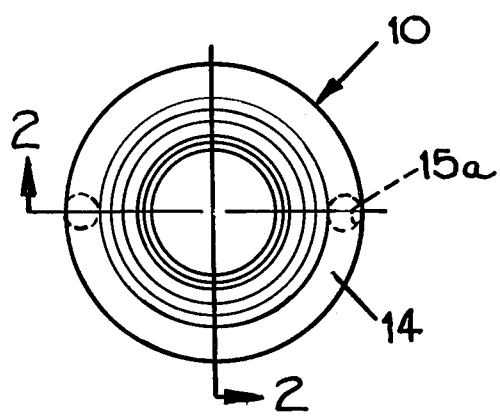
FIG. 1 is a top plan view of a mounting of the present invention.
Figure 2:
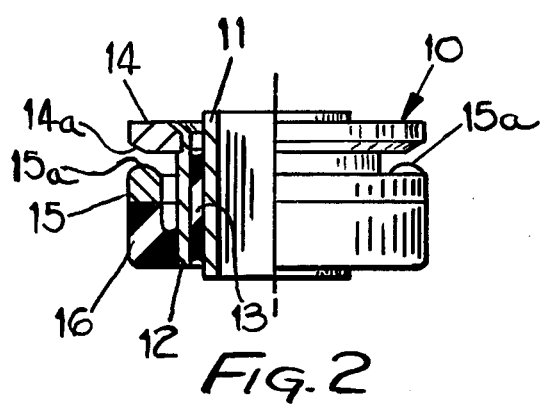
FIG. 2 is a sectional view taken substantially along the line 2—2 of FIG. 1.

In FIGS. 1 and 2 there is shown a mounting, generally indicated at 10, of the present invention. As illustrated, the mounting 10 comprises concentrically spaced inner and outer rigid cylindrical sleeves 11 and 12 subject to both relative axial and radial movement. The inner rigid sleeve 11, preferably as shown, extends beyond opposite ends of the outer rigid sleeve 12 for reasons to be hereinafter explained.

Resilient means in the form of an elastomeric annular member 13 is interposed and secured between the sleeves 11 and 12. In the present embodiment, the elastomeric member 13 is bonded to the sleeves 11 and 12 by conventional bonding techniques. The elastomeric member 13 will resiliently accommodate relative movement between the sleeves 11 and 12. The spring rates between the sleeves 11 and 12 can be controlled by the design of the elastomeric member 13, particularly by its length and thickness.

A flange 14 is carried by and adjacent one end of the outer sleeve 12. The flange 14 is continuous circumferentially of outer sleeve 12 and extends radially outward from the outer sleeve 12. The flange 14 may be formed integrally with the outer sleeve 12 or separately, as shown. When formed separately, it must be fixedly attached to the outer sleeve 12. Conventional attaching means may be utilized. It is desirable that the flange 14 include a chamfered edge 14a on the underside thereof facing in the direction of the other end of the outer sleeve 12. The flange 14 should be formed of a rigid wear resistant material of low coefficient of friction, such as nylon.

An annular lock ring 15 is concentrically disposed about the outer sleeve 12 in axially spaced relation to the flange 14. The lock ring 15 should also be formed of a rigid wear resistant material having a low coefficient of friction. The spacing from the flange 14 should be less than the thickness of a support bracket with which the mounting 10 is to be used. Also, the lock ring 15 is preferably disposed in circumferentially spaced relation to the outer sleeve 12 to allow radial movement of the outer sleeve 12 relative to the lock ring 15. The lock ring 15 includes a plurality of circumferentially spaced projections 15a extending axially toward and in opposed relation to flange 14. The lock ring 15 is resiliently interconnected to the other end of the outer sleeve 12 by an annular elastomeric member 16 having an L-shaped cross section. The end of one of the legs of the elastomeric member 16 is secured, bonded, to the outer sleeve 12 while the end of the other leg is secured, bonded, to the lock ring 15. This elastomeric member 16, thus, normally maintains the lock ring 15 in a predetermined position as shown relative to flange 14 and resiliently resists relative movement between the flange 14 and lock ring 15. It will also be noted that the lock ring 15 may move resiliently relative to the inner and outer sleeves 11 and 12.

Figure 3:
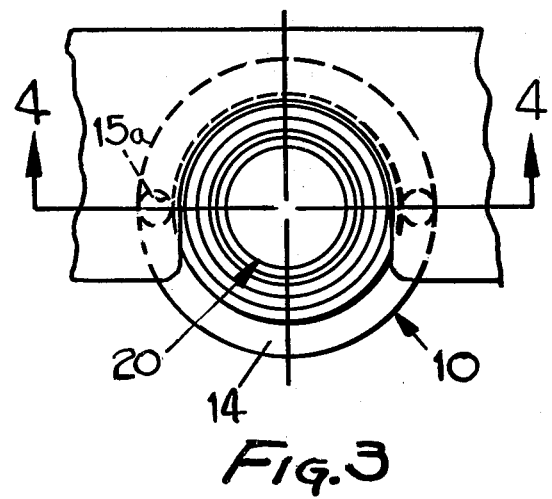
FIG. 3 is a top plan view of a mounting assembly employing the mounting of FIG. 2.
Figure 4:
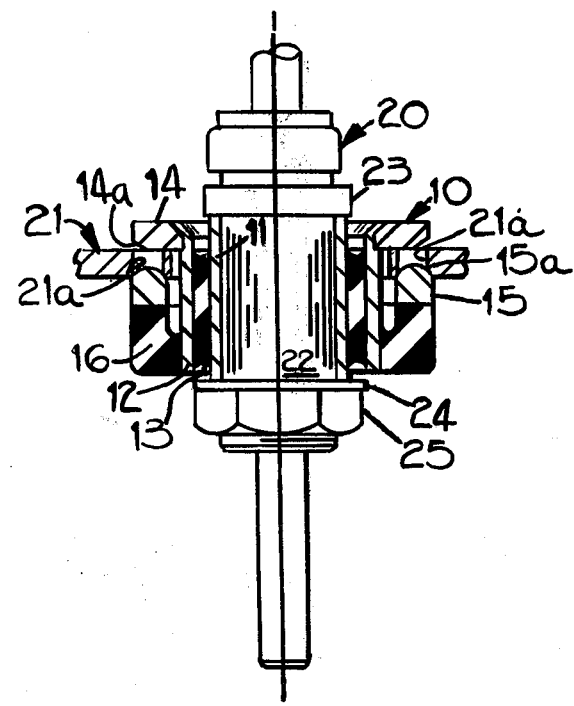
FIG. 4 is a sectional view taken substantially along the line 4—4 of FIG. 3.

With reference to FIGS. 3 and 4, there is shown a mounting assembly employing a mounting 10 for resiliently mounting a rotatable textile spindle 20 on a support bracket 21. As illustrated, the spindle 20 is fixedly mounted within inner sleeve 11 by way of a mounting sleeve 22 having an integral seating collar 23 engaging the upper end of inner sleeve 11. A washer 24 is received over the other end of sleeve 22 and is seated on the lower end of inner sleeve 11 and held there by a nut 25. The extension of inner sleeve 11 beyond outer sleeve 12 eliminates interference of the collar 23 and washer 25 with the other functional parts of the mounting 10.

With the spindle 20 secured within the mounting 10, the mounting can be assembled with the support bracket 21. The support bracket 21 is generally U-shaped for receiving the mounting 10. The thickness of the bracket should be greater than the normal axial spacing between the flange 14 and lock ring 15. Also, the opening should be wider than the external diameter of outer sleeve 12. Further, circumferentially spaced recesses or apertures 21a should be provided in the bracket 21 to coincide with the projections 15a of the lock ring 15 when the mounting 10 is fully received between the bracket legs. To install the mounting 10 on the bracket, the mounting 10 is aligned with the bracket legs and the bracket legs wedged between the flange 14 and lock ring 15. The chamfered edge 14a on the flange 14 and low coefficient of friction of flange 14 and lock ring 15 facilitates initiation of this wedging action. The elastomeric member 16 will allow the lock ring 15 to move axially away from flange 14 to receive therebetween the legs of the bracket 21. The mounting 10 is adjusted until the lock ring projections 15a and bracket recesses 21a interlock. It will be apparent that the mounting 10 can readily be removed by overcoming the resilient force of elastomeric member 16. It will also be apparent that the projections for interlocking could equally well be provided on the flange 14. The resiliently mounted lock ring 15 would still provide the positive interlock with the support bracket 21.

To prevent release of the mounting 10 from the support bracket 21 during operation, the relative axially spring rates of the elastomeric members 13 and 16 should be such that relative axially motion is predominately accommodated by elastomeric member 13. The elastomeric member 16 should only accommodate a very limited amount of axial motion. Radial motion of the outer sleeve 12 may be resiliently accommodated by elastomeric member 16 while flange 14 slides relative to the support bracket 21.

Figure 5:
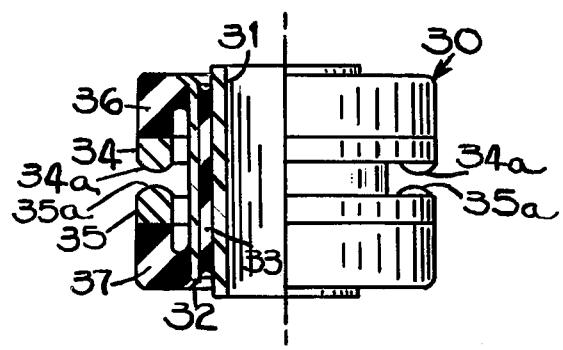
FIG. 5 is a sectional view of another mounting of the present invention.

There is shown in FIG. 5 a modified snap-in mounting, generally indicated at 30, of the present invention. The mounting 30 is substantially identical to mounting 10 except that the flange 14 has been modified to take on a form analogous to the lock means. In particular, the mounting 30 includes concentrically spaced inner and outer rigid cylindrical sleeves 31 and 32 with an elastomeric annular member 33 interposed and bonded between the sleeves 31 and 32. As with the mounting 10, the inner sleeve 31 extends beyond opposite ends of outer sleeve 32. The elastomeric member 33 resiliently accommodates relative movement, both axially and radially, between the sleeves 31 and 32. A pair of axially spaced lock rings 34 and 35 are concentrically disposed about the outer sleeve 32 in circumferentially spaced relation thereto. The lock rings 34 and 35 are resiliently interconnected to opposite ends of the outer sleeve 32. This resilient interconnection is provided by annular elastomeric members 36 and 37 having an L-shaped cross section. The ends of the legs of the elastomeric members 36 and 37 are bonded between the lock rings 34 and 35, respectively, and opposite ends of the outer sleeve 32. This resilient interconnection normally maintains the lock rings 34 and 35 in a predetermined axially spaced relation and resiliently resists movement thereof axially and radially relative to the outer sleeve 32. Both of the lock rings 34 and 35 include a plurality of circumferentially spaced projections 34a and 35a, respectively, extending axially of the mounting 30 toward opposed lock rings 34 and 35. In the present illustration, the projections 34a and 35a are axially aligned relative to each other.

Figure 6:
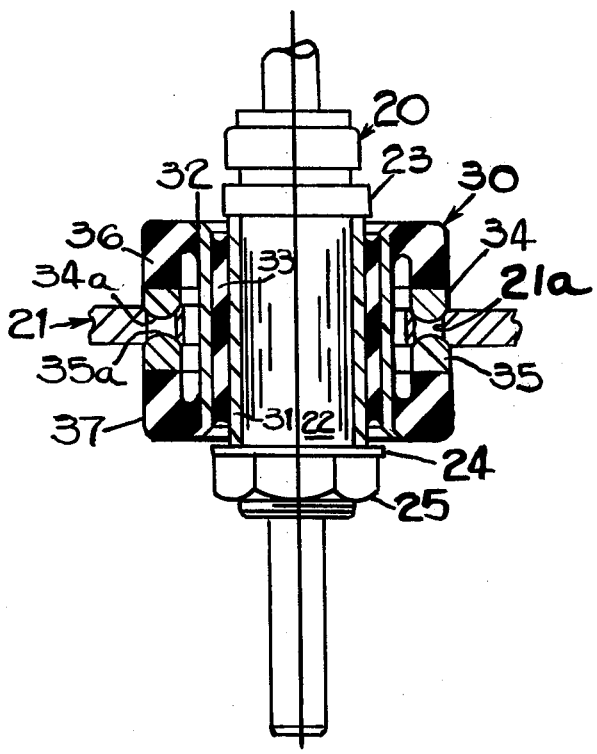
FIG. 6 is a sectional view of a mounting assembly employing the mounting of FIG. 5.

With reference to FIG. 6, there is shown a mounting assembly wherein a mounting 30 is utilized to support a spindle 20 relative to a support bracket 21. The spindle 20 and support bracket 21 are identical to that shown in FIG. 4 and accordingly will not be described again. Identical reference characters are employed. The mounting 30 is installed on the support bracket 21 in a manner identical to that for mounting 10. However, as will be apparent in FIG. 6, positive interlocking is provided on both sides of the support bracket 21 by the lock rings 34 and 35. Further, the outer sleeve 32 is resiliently mounted by both the lock rings 34 and 35 to the support bracket 21. Sliding movement has been eliminated. Accordingly, shock and/or vibration may be accommodated in the mounting through both the elastomeric member 33 interposed between the inner and outer rigid sleeves 31 and 32 and by the elastomeric members 36 and 37 which resiliently mount the lock rings 34 and 35 relative to the outer sleeve 32.

The mountings 10 and 30 have been illustrated for mounting a spindle relative to a support bracket. With the snap-in features of the mountings 10 and 30, the spindle may be permanently secured to the mounting and the combined mounting and spindle easily installed and/or removed from a support bracket. This will facilitate movement of the spindle between various spinning stations, as has become a common practice in the textile industry while providing vibration and/or shock isolation therefor.

More generally, it will be recognized that there has been provided by the present invention a mounting which can be installed and/or removed without the need for additional parts and/or tools with a minimum of time and labor and wherein the interconnection of the mounting with the support structure may provide shock and/or vibration isolation.

In the drawings and specification, there has been set forth a preferred embodiment of the invention and, although specific terms are employed, they are used in a generic and descriptive sense only and not for purposes of limitation.

What is claimed is:
1. A snap-in mounting comprising
concentrically spaced inner and outer elongate rigid sleeves subject to relative movement,
elastomeric means interposed and secured between said sleeves and resiliently accommodating said relative movement, flange means carried by and adjacent one end of said outer sleeve and extending radially outward therefrom, and lock means resiliently carried by and adjacent the other end of said outer sleeve in opposed relation to said flange means, said lock means being normally maintained in a predetermined axially spaced relation to said flange means and resiliently resisting movement relative to said flange means, said lock means comprising an annular lock ring concentrically disposed about said outer sleeve in opposed relation to said flange means and an annular elastomeric member having an L-shaped cross section with the end of one of said legs secured to said outer sleeve and the end of the other of said legs secured to said lock ring.

2. A mounting, according to claim 1, wherein said inner sleeve extends beyond opposite ends of said outer sleeve.

3. A mounting, according to claim 1, wherein said annular lock ring is disposed in circumferentially spaced relation to said outer sleeve.

4. A mounting, according to claim 1, wherein said lock ring includes a plurality of circumferentially spaced projections extending axially of said mounting toward said flange means.

5. A mounting, according to claim 1, wherein the edge of said flange means opposed to said lock means is chamfered.

6. A mounting, according to claim 1, wherein said elastomeric means comprises an elastomeric member bonded between said sleeves.

7. A snap-in mounting comprising concentrically spaced inner and outer elongate rigid sleeves subject to relative axial and radial movement, elastomeric means interposed and bonded between said rigid sleeves and resiliently accommodating said relative movement, flange means carried by and adjacent one end of said outer rigid sleeve and extending radially outward therefrom, an annular lock ring concentrically disposed about said outer rigid sleeve in circumferentially spaced relation thereto and in opposed relation to said flange means, and an annular elastomeric member having an L-shaped cross section with the end of one of said legs bonded to said outer rigid sleeve and the end of the other of said legs bonded to said lock ring.

8. A snap-in mounting comprising concentrically spaced inner and outer elongate rigid sleeves subject to relative movement, elastomeric means interposed and secured between said sleeves and resiliently accommodating said relative movement, a pair of axially spaced lock rings concentrically disposed about said outer sleeve in circumferentially spaced relation thereto, and means resiliently interconnecting said lock rings to said outer sleeve and normally maintaining said lock rings in a predetermined axially spaced relation and resiliently resisting movement thereof axially and radially relative to said outer sleeve.

9. A mounting, according to claim 8, wherein said resilient means are separate and each comprises an annular elastomeric member having an L-shaped cross section with the end of one of said legs bonded to said outer sleeve and the end of the other of said legs secured to one of said lock rings.

10. A mounting assembly comprising in combination a U-shaped support bracket, concentrically spaced inner and outer elongate rigid sleeves subject to relative movement, said sleeves being received between the legs of said bracket, elastomeric means interposed and secured between said sleeves and resiliently accommodating said relative movement, a supported structure carried internally of and by said inner sleeve, flange means carried by and adjacent one end of said outer sleeve and extending radially outward therefrom and received in engagement with one side of said support bracket, and lock means resiliently carried by and adjacent the other end of said outer sleeve in opposed relation to said flange means and being resiliently urged toward said flange means into locking engagement with the other side of said support bracket.

11. A mounting assembly, according to claim 10, wherein one of said flange means and lock means include portions interlocking with said support bracket.

12. A mounting assembly, according to claim 10, wherein said lock means and support bracket include male and female interlocking portions.

13. A mounting assembly, according to claim 10, wherein said lock means comprises an annular lock ring concentrically disposed about said outer sleeve in axially spaced and opposed relation to said flange means a distance less than the thickness of said support bracket, and an annular elastomeric member having an L-shaped cross section with the end of one of said legs secured to said outer sleeve and the end of the other of said legs secured to said lock ring.

14. a mounting assembly, according to claim 13, wherein said lock ring includes a plurality of circumferentially spaced projections extending axially toward said flange means received in correspondingly spaced recesses in the side of said bracket adjacent said lock ring.

15. A mounting assembly comprising in combination a U-shaped support bracket, concentrically spaced inner and outer elongate rigid sleeves subject to relative movement, said sleeves being received between the legs of said bracket, elastomeric means interposed and secured between said sleeves and resiliently accommodating said relative movement, a supported structure carried internally of and by said inner sleeve, a pair of axially spaced lock rings concentrically disposed about said outer sleeve in circumferentially spaced relation thereto and on opposite sides of said support bracket, and means resiliently interconnecting said lock rings to said outer sleeve and resiliently urging said lock rings into locking engagement with opposite sides of said support bracket.

16. A mounting assembly, according to claim 15, wherein each of said lock rings include a plurality of circumferentially spaced axially extending projections received in correspondingly spaced recesses in said support bracket.

* * * * *